United States Patent Office 3,447,894
Patented June 3, 1969

3,447,894
METHOD OF BENEFICIATING TANTALUM- AND NIOBIUM-CONTAINING TIN SLAGS
Robert A. Gustison, West Lawn, Reading, Frank Gorczyca, Pottstown, and John A. Cenerazzo, Pennside, Reading, Pa., assignors to Kawecki Chemical Company, New York, N.Y., a corporation of Pennsylvania
No Drawing. Filed Dec. 5, 1966, Ser. No. 598,917
Int. Cl. C22b 59/00; C21b 3/04
U.S. Cl. 23—15       6 Claims This invention relates to the treatment of tin slags and other metallurgical by-products and, more particularly, to the beneficiation of the tantalum and niobium content of tin slags containing these constituents.

Several approaches have been made to the beneficiation of the tantalum and niobium content of tin slags. One such approach has ben to roast the slag with caustic potash, but the product of this roast is difficult to handle because of its viscous nature and is difficult to leach to obtain the desired beneficiation. A related approach has been to subject the slag to high temperature digestion with a caustic soda solution under superatomspheric pressure, but the large volume of solution required for this purpose tends to carry away a considerable amount of the tantalum and niobium and requires a large amount of acid to neutralize the caustic. A wholly different approach has been to smelt the tin slag with carbon to separate much of the gangue component of the tin slag and then to oxidize the tantalum-, niobium- and carbon-containing hearth product by melting it with iron oxide or by air roasting. Both of these oxidation products are refractory with respect ot solubilizing agents such as hydrofluoric acid and further contain objectionable amounts of such initial gangue constituents as silica, titania, lime, magnesia and alumina.

We have now devised a method of beneficiating iron-bearing tantalum- and niobium-containing tin slags and other metallurgical by-products which is characterized by the use of relatively inexpensive reagents and by excellent beneficiation with high recovery of the tantalum and niobium components of the slag. The beneficiation method of our invention comprises heating the slag in the presence of sufficient carbon to convert the tantalum and niobium oxides to a hearth product containing the tantalum and niobium as carbides in admixture with a carbon-containing iron alloy, separating oxidic gangue constituents from said hearth product, reacting said hearth products with an amount of sodium nitrate such as to insure oxidation of all metallic constituents of said hearth product to their respective highest-valence heat-stable oxidic form of sodium salt, together with a source of additional sodium oxide in amount of at least 25% by weight of said sodium nitrate, leaching the resulting reaction product with hot water, subjecting the hot-water insoluble constituents of said reaction product to reaction with an aqueous mineral acid to convert the tantalum and niobium constituents thereof to their hydrated oxides and to dissolve the sodium and iron constituents, and separating the resulting aqueous phase from said hydrated oxides to leave as a residue a beneficiated mass of the tantalum and niobium oxide constituents of the starting tin slag.

The following approximate composition is that of a Malaysian tin slag:

|  | Percent |
|---|---|
| $Ta_2O_5$ | 4 |
| $Nb_2O_5$ | 4 |
| $Fe_2O_3$ | 11 |
| $SiO_2$ | 21 |
| CaO | 25 |
| $TiO_2$ | 11 |
| $Al_2O_3$ | 9 |
| $WO_3$ | 8 |
| $ZrO_2$ | 3 |
| MgO | .5 |
| $MnO_2$ | .5 |
| SnO | .5 |
| $V_2O_5$ | .5 |

Tantalum- and niobium-bearing tin slags of this composition and other tin slags, as well as other tantalum- and niobium-containing metallurgical by-products, are all amendable to the beneficiation method of our invention.

The beneficiation is effected first by a carbon reduction of at least the tantalum, niobium and iron components of the slag. Although this can be done by mixing the ground slag with powdered anthracite, pelletizing the mixture and then heating the mixture in a kiln, we presently prefer to effect the carbon reduction by smelting in an electric arc furnace. The slag to be smelted, together with sufficient carbon to reduce the iron, tantalum and niobium components of the slag, is charged to a tilting electric arc furnace and is smelted to form a hearth product and a supernatant slag. The slag product, comprising most of the silica, titania, alumina, lime and magnesia of the tin slag charge, is poured out of the furnace at a temperature of about 1300°–1700° C. Pouring is stopped when the hearth product approaches the pouring lip. The hearth product, comprising the tantalum, niobium, iron, tin and tungsten predominantly in the form of a high-carbon ferro alloy containing the tantalum and niobium in the form of their carbides, is raked out of the furnace while at a temperature of about 1400°–1800° C. The slag product is discarded, and the hearth product is crushed to prepare it for subsequent treatment. The crushed product is advantageously further upgraded by passing it over a magnetic pulley. The non-magnetic fraction is preferably returned to the smelting operation.

The magnetic fraction of the hearth product is then subjected to an exothermic oxidizing fusion operation which is an important feature of our beneficiation method. This operation comprises oxidation of the metallic constituents of the hearth product with sodium nitrate under conditions which insure substantially complete recovery of the tantalum and niobium components in the form of sodium tantalate and sodium niobate. To achieve this result, we have found it necessary to obtain a highly fluid fusion mass to permit the reaction, which is exothermic, to proceed to completion. By using an amount of sodium nitrate sufficient to oxidize all metallic constituents of the hearth product to their respective highest-valence heat-stable form of sodium salt, the requisite fluidity is provided in part by the sodium oxide component of the sodium nitrate and in part by the strongly oxidizing influence of the initial amount of sodium nitrate which insures oxidation of the titanium component to its tetravalent form and not to its highly-viscous trivalent form. By carrying out this fusion in the presence of an additional source of sodium oxide equal to at least 25% by weight of the aforesaid sodium nitrate, and advantageously equal to about 50% to about 125% by weight of said sodium nitrate, the fluidity of the reaction mass is further increased. This added amount of a source of sodium oxide can be any oxidic compound of sodium such as the hydroxide, carbonate, sulfate, or the like, although we presently prefer to supply the added sodium oxide in the form of excess sodium nitrate because of its strong oxidizing property.

The fusion-oxidation operation is carried out by mixing the ground hearth product with the sodium nitrate and with the additional sodium oxide-producing material, and then igniting the mixture. Initial excesses of sodium nitrate above about 150% appear to have no beneficial effect and merely represent a heat sink. In addition to this stoichiometric amount of sodium nitrate plus additional sources of sodium oxide, we have found it advantageous to add to the mixture a further quantity of sodium nitrate accompanied by its stoichiometric equivalent of extraneous oxidizable material such as carbon, sulfur, hydrocarbons, iron powder, pyrites, or the like. This added component of sodium nitrate and oxidizable material provides by its interreaction an additional amount of exothermic heat and renders the oxidation reaction completely self-sustaining. By thus increasing the temperature of the reaction mass and by contributing an additional source of sodium oxide, a maximum degree of fluidity is imparted to the fusion mass. In general, we have found that the amount of extraneous oxidizable material should range from about 1/8 to 1/4 of the carbon content of the hearth product, but it will be appreciated that no extraneous oxidizable material will be needed if the main oxidation reaction is carried out under heat-conserving or other heat-supplementing condition such that the primary oxidation reaction produces a highly fluid and actively bubbling fusion mass.

The exothermic mixture of hearth product, sodium nitrate (such as commercial Chilean nitrate) and carbon (such as lampblack, coke breeze, or the like) is ignited by any convenient means. We have found it suitable to pour a small quantity of a liquid petroleum product such as kerosene onto the top of the mixture and then ignite the kerosene. Within a few minutes the reaction is initiated and transforms the mass to a fluid melt at a temperature of about 800°–1200° C. Generally within about 6 to 10 minutes after initiation of the reaction, it has become complete as indicated by quiescence of the melt. It is then allowed to cool to solidification, whereupon the cooled solid is crushed to prepare it for subsequent leaching.

Leaching the crushed fusion mass is effected by hot water to remove the excess soda and other water-soluble sodium salts such as sodium silicate and sodium tungstate. The amount of water useful for this purpose ranges between about 3 to 12 times, and preferably 6 times, the weight of the hearth product reacted with the sodium nitrate. The temperature of the leach water is raised to close to its boiling point to speed the leaching. Leaching temperatures of 90°–95° C., accompanied by agitation, will generally effect thorough leaching in about 2 hours. The leach liquor is then separated by filtration or by other solid-liquid separation techniques and the solids, consisting principally of sodium tantalate, sodium niobate, ferric hydroxide, tetravalent titanium hydroxide, calcium carbonate, silica and magnesium hydrate, are subsequently acidified to convert the tantalum and niobium components to the corresponding hydrated oxides.

Acidification is effected with a mineral acid such as hydrochloric acid. The amount of acid required is essentially that stoichiometrically necessary for complete neutralization of the sodium salts and dissolution of the ferric hydroxide. In general, we have found that 2 pounds of 22° Bé hydrochloric acid per pound of hearth product reacted with the sodium nitrate is sufficient to effect conversion of the tantalum and niobium components to their hydrated oxides and to dissolve the calcium, iron, magnesium, manganese and sodium components of the leached solids. The leaching of the filter cake with acid is continued at a temperature of about 75°–100° C., and preferably at about 95° C., for 1 to 4 hours, and the resulting slurry is then subjected to solid-liquid separation. The solids comprise the beneficiated tin slag product of the invention and consists essentially of the hydrated oxides of tantalum and niobium with residual amounts of titania, silica, lime, and iron. When the $M_2O_5$ (tantalum and niobium oxides) content of the starting tin slag is about 8%, their content in the beneficiated final product is about 50%.

The following specific example of our beneficiation method is illustrative of the practice of the invention:

To a tilting electric arc furnace there was charged 8000 pounds of Malaysian tin slag and 1120 pounds of coke crushed to 1/4 inch and smaller. The charge was smelted to form 2900 pounds of a hearth product and about 4500 pounds of a supernatant slag. The furnace was tilted to pour off the slag product at a temperature of about 1550° C., and pouring was stopped when the sliding hearth product, at a temperature of about 1800° C., reached the pouring lip. The hearth product was raked into a ladle where it was allowed to cool. The slag product contained about 1.6% $TiO_2$, 19% $Al_2O_3$, 46% CaO, 32% $SiO_2$ and 1.6% MgO, and the hearth product comprised 10.3% $Ta_2O_5$, 12.1% $Nb_2O_5$, 12.9% $TiO_2$, 2.4% $Al_2O_3$, 10.1% CaO, 13.7% $SiO_2$, 23.9% Fe, 3.2% MgO, and the balance essentially carbon.

The hearth product was broken and crushed to minus 8 mesh (Tyler standard) and was subjected to magnetic separation. The non-magnetic component (about 700 pounds) was returned to a subsequent tin slag smelting step. A 200 pound mass of the magnetic hearth product was then mixed with 30 pounds of lampblack and 520 pounds of commercial grade sodium nitrate in an unlined cast iron pot, and this reaction mixture was ignited by pouring a small amount of kerosene over the mass and igniting the kerosene. Within a few minutes the reaction began and converted the mixture to a highly fluid, bubbling, reaction mass at a temperature of about 1000° C. The mass became quiescent about 8 minutes after the reaction started, and this quiescence was used as the indicator of reaction completion. After the mass had cooled and solidified, it was found to weigh about 520 pounds. The cooled mass was crushed to minus 1/4 inch size and was leached with 130 gallons of water for 4 hours at 90° C. with constant agitation. The leach liquor, containing most of the tungsten, was separated by filtration, and the filter cake was then re-pulped with 40 gallons of water and 400 pounds of 22° Bé hydrochloric acid. The acidulated mass was maintained at 95° C. for 4 hours with constant agitation, and finally the aqueous phase was separated by filtration. The filter cake, when dried, contained 22.2% $Ta_2O_5$ and 25.5% $Nb_2O_5$ and constituted the beneficiated product from the initial tin slag. This product was then subjected to dissolution in hydrofluoric acid and to further treatment which had previously been developed for extraction of tantalum and niobium from their ores, and it was found that the beneficiated product obtained by the method of our invention responded to this extraction treatment as readily as the tantalum and niobium ores.

We claim:

1. The method of beneficiating the tantalum and niobium oxide contents of an iron-bearing tin slag or other metallurgical by-product which comprises heating the slag in the presence of sufficient carbon to convert the tantalum and niobium oxides to a hearth product containing the tantalum and niobium as carbides in admixture with a carbon-containing iron alloy, separating oxidic gangue constituents from said hearth product, reacting said hearth product with an amount of sodium nitrate such as to insure oxidation of all metallic constituents of said hearth product to their respective highest-valence heat-stable oxidic form of sodium salt, together with a source of additional sodium oxide in amount of at least about 25% by weight of said sodium nitrate, leaching the resulting reaction product with hot water, subjecting the hot water-insoluble constituents of said reaction product to reaction with an aqueous mineral acid to convert the tantalum and niobium constituents thereof to their hydrated oxides and to dissolve the sodium and iron constituents, and separating the resulting aqueous phase from said hydrated oxides to leave as a residue a beneficiated mass of the tantalum and niobium oxide constituents of the starting tin slag.

2. The method according to claim 1 in which the conversion of the tantalum and niobium oxides of the tin slag to a hearth product is effected by smelting in an electric arc furnace.

3. The method according to claim 1 in which the source of additional sodium oxide is sodium nitrate.

4. The method according to claim 1 in which an additional amount of sodium nitrate and an oxidizable material in substantially stoichiometric proportions is added to the reaction mixture of hearth product and sodium nitrate.

5. The method according to claim 4 in which the oxidizable material is carbon.

6. The method according to claim 1 in which the mineral acid is hydrochloric acid.

References Cited

UNITED STATES PATENTS

| | | | |
|---|---|---|---|
| 2,131,350 | 9/1938 | Leemans | 23—15 X |
| 2,140,800 | 12/1938 | Leemans | 23—15 X |
| 2,205,386 | 6/1940 | Balke et al. | 23—208 X |
| 2,972,530 | 2/1961 | Zimmerley et al. | 75—1 |
| 2,999,747 | 9/1961 | Ronzio | 75—1 |
| 3,061,407 | 10/1962 | Burkin et al. | 23—18 |
| 3,099,526 | 7/1963 | Li et al. | 23—18 |

HERBERT T. CARTER, *Primary Examiner.*

U.S. Cl. X.R.

23—18, 19, 50, 208; 75—1, 24, 121